(12) United States Patent
Dolan

(10) Patent No.: US 7,820,300 B2
(45) Date of Patent: *Oct. 26, 2010

(54) ARTICLE OF MANUFACTURE AND PROCESS FOR ANODICALLY COATING AN ALUMINUM SUBSTRATE WITH CERAMIC OXIDES PRIOR TO ORGANIC OR INORGANIC COATING

(75) Inventor: Shawn E. Dolan, Sterling Heights, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 346 days.

This patent is subject to a terminal disclaimer.

(21) Appl. No.: 11/156,425

(22) Filed: Jun. 20, 2005

(65) Prior Publication Data

US 2006/0013986 A1     Jan. 19, 2006

Related U.S. Application Data

(63) Continuation-in-part of application No. 10/972,592, filed on Oct. 25, 2004, now Pat. No. 7,569,132, which is a continuation-in-part of application No. 10/162,965, filed on Jun. 5, 2002, now Pat. No. 6,916,414, which is a continuation-in-part of application No. 10/033,554, filed on Oct. 19, 2001, now abandoned, which is a continuation-in-part of application No. 09/968,023, filed on Oct. 2, 2001, now abandoned.

(51) Int. Cl.
*B32B 15/04* (2006.01)
(52) U.S. Cl. .................. 428/472.2; 428/469; 428/472
(58) Field of Classification Search .............. 428/650, 428/632, 633, 651, 660, 421, 422, 447, 934
See application file for complete search history.

(56) References Cited

U.S. PATENT DOCUMENTS

| | | |
|---|---|---|
| 2,081,121 A | 5/1937 | Stareck |
| 2,231,372 A | 2/1941 | Rothe |
| 2,231,373 A | 2/1941 | Schenk |
| 2,275,223 A | 3/1942 | Hardoen |
| 2,305,669 A | 12/1942 | Budiloff et al. |
| 2,573,229 A | 10/1951 | Stern |
| 2,858,285 A | 10/1958 | Johnson |
| 2,880,148 A | 3/1959 | Evangelides |
| 2,901,409 A | 8/1959 | DeLong |
| 2,926,125 A | 2/1960 | Currah et al. |
| 3,345,276 A | 10/1967 | Munroe |
| 3,524,799 A | 8/1970 | Dale |
| 3,620,940 A | 11/1971 | Wick |
| 3,681,180 A | 8/1972 | Kent |
| 3,729,391 A | 4/1973 | Houghton et al. |
| 3,778,315 A | 12/1973 | Booker et al. |
| 3,824,159 A | 7/1974 | Wehrmann |
| 3,864,224 A | 2/1975 | Cotton et al. |
| 3,865,560 A | 2/1975 | Sabetay |
| 3,945,899 A | 3/1976 | Nikaido et al. |
| 3,956,080 A | 5/1976 | Hradcovsky et al. |
| 3,960,676 A | 6/1976 | Miyosawa et al. |
| 3,996,115 A | 12/1976 | Kessler |
| 4,082,626 A | 4/1978 | Hradcovsky |
| 4,094,750 A | 6/1978 | Mackey |
| RE29,739 E | 8/1978 | Kessler |
| 4,110,147 A | 8/1978 | Grunwald et al. |
| 4,113,598 A | 9/1978 | Jozwiak et al. |
| 4,145,263 A | 3/1979 | Tsutsui et al. |
| 4,166,777 A | 9/1979 | Casson, Jr. et al. |
| 4,184,926 A | 1/1980 | Kozak |
| 4,188,270 A | 2/1980 | Kataoka |
| 4,200,475 A | 4/1980 | Kasahara et al. |
| 4,227,976 A | 10/1980 | Menke |
| 4,298,661 A | 11/1981 | Ikeno et al. |
| 4,370,538 A | 1/1983 | Browning |
| 4,383,897 A | 5/1983 | Gillich et al. |
| 4,399,021 A | 8/1983 | Gillich et al. |
| 4,401,489 A | 8/1983 | Arai et al. |
| 4,439,287 A | 3/1984 | Birkle et al. |
| 4,448,647 A | 5/1984 | Gillich et al. |
| 4,452,674 A | 6/1984 | Gillich et al. |
| 4,455,201 A | 6/1984 | Birkle et al. |
| 4,456,663 A | 6/1984 | Leonard |
| 4,473,110 A | 9/1984 | Zawierucha |
| 4,511,633 A | 4/1985 | Bruno et al. |
| 4,551,211 A | 11/1985 | Kobayashi et al. |
| 4,578,156 A | 3/1986 | Plazter |
| 4,579,786 A | 4/1986 | Nakakouji et al. |
| 4,620,904 A | 11/1986 | Kozak |
| 4,659,440 A | 4/1987 | Hradcovsky |

(Continued)

FOREIGN PATENT DOCUMENTS

CN     1392284 A     1/2003

(Continued)

OTHER PUBLICATIONS

U.S. Appl. No. 10/972,591, filed Oct. 25, 2004, Dolan co-pending application.

(Continued)

*Primary Examiner*—John J Zimmerman
(74) *Attorney, Agent, or Firm*—Mary Cameron

(57) ABSTRACT

An article of manufacture and a process for making the article by the anodization of aluminum and aluminum alloy workpieces to provide corrosion-, heat- and abrasion-resistant ceramic coatings comprising titanium and/or zirconium oxides, and the subsequent coating of the anodized workpiece with a second coating such as polytetrafluoroethylene ("PTFE") or silicone containing coatings. The invention is especially useful for forming longer life coatings on aluminum substrates by pre-coating the substrate with an anodized layer of titanium and/or zirconium oxide that provides excellent corrosion-, heat- and abrasion-resistance in a hard yet flexible film.

24 Claims, No Drawings

U.S. PATENT DOCUMENTS

| | | | |
|---|---|---|---|
| 4,668,347 A | 5/1987 | Habermann et al. | |
| 4,744,872 A | 5/1988 | Kobayashi et al. | |
| 4,775,600 A | 10/1988 | Adaniya et al. | |
| 4,786,336 A | 11/1988 | Schoener et al. | |
| 4,839,002 A | 6/1989 | Pernick et al. | |
| 4,859,288 A | 8/1989 | Furneaux et al. | |
| 4,869,789 A | 9/1989 | Kurze et al. | |
| 4,869,936 A | 9/1989 | Moskowitz et al. | |
| 4,882,014 A | 11/1989 | Coyle et al. | |
| 4,976,830 A | 12/1990 | Schmeling et al. | |
| 4,978,432 A | 12/1990 | Schmeling et al. | |
| 5,032,129 A | 7/1991 | Kurze et al. | |
| 5,087,645 A | 2/1992 | Kojima et al. | |
| 5,100,486 A | 3/1992 | Krikorian et al. | |
| 5,102,746 A | 4/1992 | Shindou et al. | |
| 5,221,576 A | 6/1993 | Bosc et al. | |
| H1207 H | 7/1993 | Smith | |
| 5,240,589 A | 8/1993 | Bartak et al. | |
| 5,264,113 A | 11/1993 | Bartak et al. | |
| 5,266,412 A | 11/1993 | Bartak et al. | |
| 5,275,713 A | 1/1994 | Hradcovsky | |
| 5,281,282 A | 1/1994 | Dolan et al. | |
| 5,283,131 A | 2/1994 | Mori et al. | |
| 5,302,414 A | 4/1994 | Alkhimov et al. | |
| 5,385,662 A | 1/1995 | Kurze et al. | |
| 5,441,580 A | 8/1995 | Tomlinson | |
| 5,451,271 A | 9/1995 | Yoshida et al. | |
| 5,470,664 A | 11/1995 | Bartak et al. | |
| 5,478,237 A | 12/1995 | Ishizawa | |
| 5,700,366 A | 12/1997 | Steblianko et al. | |
| 5,775,892 A | 7/1998 | Miyasaka et al. | |
| 5,792,335 A | 8/1998 | Barton | |
| 5,811,194 A | 9/1998 | Kurze et al. | |
| 5,837,117 A | 11/1998 | Allegret | |
| 5,958,604 A | 9/1999 | Riabkov et al. | |
| 5,981,084 A | 11/1999 | Riabkov et al. | |
| 6,059,897 A | 5/2000 | Koerner et al. | |
| 6,082,444 A | 7/2000 | Harada et al. | |
| 6,090,490 A | 7/2000 | Mokerji | |
| 6,127,052 A | 10/2000 | Tomari | |
| 6,153,080 A | 11/2000 | Heimann et al. | |
| 6,159,618 A | 12/2000 | Danroc et al. | |
| 6,165,630 A | 12/2000 | Gehlhaar et al. | |
| 6,197,178 B1 | 3/2001 | Patel et al. | |
| 6,245,436 B1 | 6/2001 | Boyle | |
| 6,280,598 B1 | 8/2001 | Barton et al. | |
| 6,335,099 B1 | 1/2002 | Higuchi et al. | |
| 6,372,115 B1 | 4/2002 | Miyasaka et al. | |
| 6,797,147 B2 | 9/2004 | Dolan | |
| 6,861,101 B1 | 3/2005 | Kowalsky et al. | |
| 6,863,990 B2 | 3/2005 | Wu et al. | |
| 6,869,703 B1 | 3/2005 | Spitsberg et al. | |
| 6,875,529 B1 | 4/2005 | Spitsberg et al. | |
| 6,896,970 B2 | 5/2005 | Mayzel | |
| 6,916,414 B2 | 7/2005 | Dolan | |
| 7,452,454 B2 | 11/2008 | Dolan | |
| 7,569,132 B2 | 8/2009 | Dolan | |
| 7,578,921 B2 | 8/2009 | Dolan | |
| 2001/0007714 A1* | 7/2001 | Gaboury et al. | 428/421 |
| 2003/0000847 A1 | 1/2003 | Ostrovsky | |
| 2003/0070935 A1 | 4/2003 | Dolan | |
| 2003/0075453 A1 | 4/2003 | Dolan | |
| 2003/0150524 A1 | 8/2003 | Wichelhaus et al. | |
| 2004/0099535 A1 | 5/2004 | Schweinsberg et al. | |
| 2007/0144914 A1 | 6/2007 | Schweinsberg et al. | |
| 2009/0162563 A1 | 6/2009 | Schweinsberg et al. | |

FOREIGN PATENT DOCUMENTS

| | | |
|---|---|---|
| DE | 28 90 65 A5 | 4/1991 |
| DE | 289054 A5 | 4/1991 |
| DE | 41 04 847 | 8/1992 |
| EP | 0259657 A1 | 3/1988 |
| EP | 0594374 A1 | 4/1994 |
| EP | 0823496 A1 | 2/1998 |
| EP | 0978576 A1 | 2/2000 |
| EP | 1002644 A2 | 5/2000 |
| EP | 0780494 B1 | 11/2002 |
| EP | 1407832 A2 | 2/2004 |
| FR | 25 49 092 | 5/1983 |
| FR | 2657090 | 11/1995 |
| GB | 294237 | 9/1929 |
| GB | 493935 | 10/1938 |
| GB | 1051665 A | 12/1966 |
| GB | 1319912 A | 6/1973 |
| GB | 2158842 A | 11/1985 |
| GB | 2343681 | 7/2000 |
| JP | 5311133 | 2/1978 |
| JP | 57 060098 | 4/1982 |
| JP | 05287587 A | 8/1982 |
| JP | 57131391 A | 8/1982 |
| JP | 58 001093 | 1/1983 |
| JP | 59 016994 | 1/1984 |
| JP | 63100194 A | 5/1986 |
| JP | 63087716 A | 4/1988 |
| JP | 4308093 A | 10/1992 |
| JP | 2000248398 A | 9/2000 |
| JP | 3132133 B2 | 2/2001 |
| RU | 2049162 | 11/1995 |
| RU | 2112087 | 5/1998 |
| SU | 617493 | 7/1978 |
| WO | WO 92/14868 | 9/1992 |
| WO | WO 98/42892 | 3/1998 |
| WO | WO 98/42895 | 10/1998 |
| WO | WO 99/02759 | 1/1999 |
| WO | WO 00/03069 | 1/2000 |
| WO | WO 02/28838 A2 | 4/2002 |
| WO | WO 03/029529 A | 4/2003 |
| WO | WO 2006/047500 A2 | 5/2006 |

OTHER PUBLICATIONS

U.S. Appl. No. 10/972,594, filed Oct. 25, 2004, Dolan co-pending application.
U.S. Appl. No. 10/972,592, filed Oct. 25, 2004, Dolan co-pending application.
Zozulin, Alex J.; "A Chromate-Free Anodize Process for Magnesium Alloys: A Coating with Superior Characteristics", pp. 47-63.
Zozulin, et al.; "Anodized Coatings for magnesium Alloys", Metal Finishing, Mar. 1994, pp. 39-44.
IBM Technical Disclosure Bulletin, "Forming Protective Coatings on Magnesium Alloys", Dec. 1967, p. 862.
Barton, et al.; "The Effect of Electrolyte on the Anodized Finish of a magnesium Alloy"; Plating & Surface Finishing, pp. 138-141, May 1995.
Jacobson, et al.; "American Electroplaters and Surface Finishers Society", pp. 541-549.
Surface and Coatings Technology 122, "Plazma Electrolysis for Surface Engineering", (1999), pp. 73-93.
Galvanotechnik, "Plasmachemische Oxidationsverfahren Teil 1: Historie und Verfahrensgrundlagen", (Apr. 2003), pp. 816-823.
Galvanotechnik, "Plasmachemische Oxidationsverfahren Teil 2: Apparative Voraussetzungen", Jun. 2003, pp. 1374-1382.
Galvanotechnik, Plasmachemische Oxidationsverfahren Teil 3 Neue Schicht-systeme, aussergewoehnliche Substratmaterialien und deren gegenwaetige und zukueftige Anwendungsfelder, (Jul. 2003), pp. 1634-1645.
Sworn Declaration of Dr. Peter Kurze dated Jul. 5, 2000, submitted in connection with PCT Publication WO96/28591 of Magnesiu Technology Limited.
JP 05287587 Abstract.
Zhou, Y. et al, "Electrochemical Deposition and Microstructure of Copper (I) Oxide Films", Scripta Materials, vol. 38, No. 11 pp. 1731-1738 (1998).

Yoshimura et al, "Recent developments in soft, solution processing. one step fabrication of functional double oxide films by hydrothermal-electrochemical methods", Journal of Materials Chemistry, vol. 9, pp. 77-82 (1999).

International Search Report dated Jan. 4, 2007, PCT International Application PCT/US05/38337.

Written Opinion dated Jan. 4, 2007, PCT International Application PCT/US05/38337.

Supplementary European Search Report, EP 05 81 2094, dated May 3, 2010.

* cited by examiner

ARTICLE OF MANUFACTURE AND PROCESS FOR ANODICALLY COATING AN ALUMINUM SUBSTRATE WITH CERAMIC OXIDES PRIOR TO ORGANIC OR INORGANIC COATING

This application is a continuation-in-part of application Ser. No. 10/972,592, filed Oct. 25, 2004, now U.S. Pat. No. 7,569,132 which is a continuation-in-part of application Ser. No. 10/162,965, filed Jun. 5, 2002, now U.S. Pat. No. 6,916,414 which is a continuation-in-part of application Ser. No. 10/033,554, filed Oct. 19, 2001, now abandoned which is a continuation-in-part of application Ser. No. 09/968,023, filed Oct. 2, 2001, now abandoned each of which are incorporated herein by reference.

FIELD OF THE INVENTION

This invention relates to anodically applied electrodeposited coating of aluminum and aluminum alloy workpieces to provide coatings comprising titanium and/or zirconium oxides, and the subsequent coating of the anodized workpiece with organic coatings, inorganic coatings and/or coatings that contain both organic and inorganic substances. Particular examples of subsequent coatings include paints, thermal spray applied coatings and coatings comprising polytetrafluoroethylene (hereinafter referred to as "PTFE") or silicone. The invention is especially useful for forming longer life thermal spray applied, PTFE or silicone non-stick coatings on aluminum substrates.

BACKGROUND OF THE INVENTION

Aluminum and its alloys have found a variety of industrial applications. However, because of the reactivity of aluminum and its alloys, and their tendency toward corrosion and environmental degradation, it is necessary to provide the exposed surfaces of these metals with an adequate corrosion-resistant and protective coating. Further, such coatings should resist abrasion so that the coatings remain intact during use, where the metal article may be subjected to repeated contact with other surfaces, particulate matter and the like. Where the appearance of articles fabricated is considered important, the protective coating applied thereto should additionally be uniform and decorative.

In order to provide an effective and permanent protective coating on aluminum and its alloys, such metals have been anodized in a variety of electrolyte solutions, such as sulfuric acid, oxalic acid and chromic acid, which produce an alumina coating on the substrate. While anodization of aluminum and its alloys is capable of forming a more effective coating than painting or enameling, the resulting coated metals have still not been entirely satisfactory for their intended uses. The coatings frequently lack one or more of the desired degree of flexibility, hardness, smoothness, durability, adherence, heat resistance, resistance to acid and alkali attack, corrosion resistance, and/or imperviousness required to meet the most demanding needs of industry.

Heat resistance is a very desirable feature of a protective coating for aluminum and its alloys. In the cookware industry, for instance, aluminum is a material of choice due to its light weight and rapid heat conduction properties. However, bare aluminum is subject to corrosion and discoloration, particularly when exposed to ordinary food acids such as lemon juice and vinegar, as well as alkali, such as dishwasher soap. PTFE or silicone containing paints are a common heat resistant coating for aluminum, which provide resistance to corrosion and discoloration and provide a "non-stick" cooking surface. However, PTFE containing paints have the drawback of insufficient adherence to the substrate to resist peeling when subjected to abrasion. To improve adherence of PTFE coatings, manufacturers generally must provide three coats of paint on the aluminum substrate: a primer, a midlayer and finally a topcoat containing PTFE. This three-step process is costly and does not solve the problem of insufficient abrasion resistance and the problem of subsequent corrosion of the underlying aluminum when the protective paint, in particular the PTFE coating wears off. Likewise, the non-stick silicone coatings eventually wear away and the underlying aluminum is exposed to acid, alkali and corrosive attack.

To improve toughness and abrasion resistance, it is known in the cookware industry to anodize aluminum to deposit a coating of aluminum oxide, using a strongly acidic bath (pH<1), and to thereafter apply a non-stick seal coating containing PTFE. A drawback of this method is the nature of the anodized coating produced. The aluminum oxide coating is not as impervious to acid and alkali as oxides of titanium and/or zirconium. Articles coated using this known process lose their PTFE coatings with repeated exposure to typical dishwasher cycles of hot water and alkaline cleaning agents.

So called, hard anodizing aluminum results in a harder coating of aluminum oxide, deposited by anodic coating at pH<1 and temperatures of less than 3° C., which generates an alpha phase alumina crystalline structure that still lacks sufficient resistance to corrosion and alkali attack.

Thus, there is still considerable need to develop alternative anodization processes for aluminum and its alloys which do not have any of the aforementioned shortcomings and yet still furnish adherent, corrosion-, heat- and abrasion-resistant protective coatings of high quality and pleasing appearance.

In another known attempt to provide a corrosion-, heat- and abrasion-resistant coating to support adherence of PTFE to aluminum, an aluminum alloy was thermally sprayed with titanium dioxide to generate a film that is physically adhered to the underlying aluminum. This film had some adherence to the aluminum article, but showed voids in the coating that are undesirable. Thermal spraying technology involves heating and projecting particles onto a prepared surface. Most metals, oxides, cermets, hard metallic compounds, some organic plastics and certain glasses may be deposited by one or more of the known thermal spray processes. Feedstock may be in the form of powder, wire, flexible powder-carrying tubes or rods depending on the particular process. As the material passes through the spray gun, it is heated to a softened or molten state, accelerated and, in the case of wire or rod, atomized. A confined stream of hot particles generated in this manner is propelled to the substrate and as the particles strike the substrate surface they flatten and form thin platelets which conform and adhere to the irregularities of the previously prepared surface as well as to each other. Either the gun or the substrate may be translated and the sprayed material builds up particle by particle into a lamellar structure which forms a coating. This particular coating technique has been in use for a number of years as a means of surface restoration and protection. In aerospace, aluminum components are often coated with thermal spray coatings of zirconia and yttria to provide a thermal barrier. A newer variation includes cold spray material deposition, which involves directing particles of a coating material toward the target surface at a velocity sufficiently high to cause the particles to deform and to adhere to the target surface. Various aspects of thermal spray coating are taught in U.S. Pat. Nos. 4,370,538; 4,869,936; 5,302,414; 6,082,444; 6,861,101; 6,863,990; 6,869,703; 6,875,529; incorporated herein by reference.

It has now been discovered that surprising improvements in performance of thermal spray coated products can be achieved by depositing an underlayer according to the invention on an aluminum alloy substrate and then depositing the thermal spray coating on the oxide underlayer of the invention.

SUMMARY OF THE INVENTION

Applicant has developed a process whereby articles of aluminum or aluminum alloy may be rapidly coated with anodically applied electrodeposited coating to form protective coatings that are resistant to corrosion and abrasion using anodizing solutions containing complex fluorides and/or complex oxyfluorides. The anodizing solution is aqueous and comprises one or more components selected from water-soluble and water-dispersible complex fluorides and oxyfluorides of elements selected from the group consisting of Ti, Zr, Hf, Sn, Al, Ge and B. The use of the term "solution" herein is not meant to imply that every component present is necessarily fully dissolved and/or dispersed. Some anodizing solutions of the invention comprise a precipitate or develop a small amount of sludge in the bath during use, which does not adversely affect performance. In especially preferred embodiments of the invention, the anodizing solution comprises one or more components selected from the group consisting of the following:

a) water-soluble and/or water-dispersible phosphorus oxysalts, wherein the phosphorus concentration in the anodizing solution is at least 0.01M;
b) water-soluble and/or water-dispersible complex fluorides of elements selected from the group consisting of Ti, Zr, Hf, Sn, Al, Ge and B;
c) water-soluble and/or water-dispersible zirconium oxysalts;
d) water-soluble and/or water-dispersible vanadium oxysalts;
e) water-soluble and/or water-dispersible titanium oxysalts;
f) water-soluble and/or water-dispersible alkali metal fluorides;
g) water-soluble and/or water-dispersible niobium salts;
h) water-soluble and/or water-dispersible molybdenum salts;
i) water-soluble and/or water-dispersible manganese salts;
j) water-soluble and/or water-dispersible tungsten salts; and
k) water-soluble and/or water-dispersible alkali metal hydroxides.

In one embodiment of the invention, niobium, molybdenum, manganese, and/or tungsten salts are co-deposited in a ceramic oxide film of zirconium and/or titanium.

The method of the invention comprises providing a cathode in contact with the anodizing solution, placing the article as an anode in the anodizing solution, and passing a current through the anodizing solution at a voltage and for a time effective to form the anodically applied electrodeposited protective coating on the surface of the article. Pulsed direct current or alternating current is generally preferred. Non-pulsed direct current may also be used. When using pulsed current, the average voltage is preferably not more than 250 volts, more preferably, not more than 200 volts, or, most preferably, not more than 175 volts, depending on the composition of the anodizing solution selected. The peak voltage, when pulsed current is being used, is preferably not more than 600, most preferably 500 volts. In one embodiment, the peak voltage for pulsed current is not more than, in increasing order of preference 600, 575, 550, 525, 500, 480, 450 volts and independently not less than 300, 310, 320, 330, 340, 350, 360, 370, 380, 390, 400 volts. When alternating current is being used, the voltage may range from about 200 to about 600 volts. In another alternating current embodiment, the voltage is, in increasing order of preference 600, 575, 550, 525, 500 volts and independently not less than 300, 310, 320, 330, 340, 350, 360, 370, 380, 390, 400 volts. In the presence of phosphorus containing components, non-pulsed direct current, also known as straight direct current, may be used at voltages from about 200 to about 600 volts. The non-pulsed direct current desirably has a voltage of, in increasing order of preference 600, 575, 550, 525, 500 volts and independently not less than 300, 310, 320, 330, 340, 350, 360, 370, 380, 390, 400 volts.

It is an object of the invention to provide a method of forming a protective coating on a surface of a metal article comprising aluminum or aluminum alloy, the method comprising: providing an anodizing solution comprised of water and one or more additional components selected from the group consisting of water-soluble complex fluorides, water-soluble complex oxyfluorides, water-dispersible complex fluorides, and water-dispersible complex oxyfluorides of elements selected from the group consisting of Ti, Zr, Hf, Sn, Al, Ge and B and mixtures thereof; providing a cathode in contact with the anodizing solution; placing a metal article comprising aluminum or aluminum alloy as an anode in the electrodeposition anodizing solution; passing a current between the anode and cathode through the solution for a time effective to form a first protective coating on the surface of the metal article; removing the metal article having a first protective coating from the anodizing solution and drying the article; and applying one or more layers of coating material to the metal article having a first protective coating, preferably at least one of the layers comprising a thermal spray applied material such as metal, oxide, organic substances and mixtures thereof, PTFE or silicone, to form a second protective coating.

It is a further object of the invention to provide a method wherein the first protective coating comprises titanium dioxide and/or zirconium oxide. It is a yet further object of the invention to provide a method wherein the first protective coating is comprised of titanium dioxide and the current is direct current.

It is a further object of the invention to provide a method wherein the anodizing solution is maintained at a temperature of from 0° C. to 90° C. It is also a further object of the invention to provide a method wherein the current is pulsed direct current having an average voltage of not more than 200 volts. It is a further object of the invention to provide a method wherein the metal article is aluminum and the current is direct current or alternating current. It is a further object of the invention to provide a method wherein the current is pulsed direct current.

It is a further object of the invention to provide a method wherein the protective coating is formed at a rate of at least 1 micron thickness per minute.

It is a further object of the invention to provide a method wherein the second protective coating comprises a non-stick topcoat comprising PTFE or silicone and at least one additional coating layer, such as paint or thermal spray applied material, between the topcoat and the first protective coating.

It is a further object of the invention to provide a method wherein the anodizing solution is prepared using a complex fluoride selected from the group consisting of H2TiF6, H2ZrF6, H2HfF6, H2SnF6, H2GeF6, H3AlF6, HBF4 and salts and mixtures thereof and optionally comprises HF or a salt thereof.

It is a further object of the invention to provide a method wherein the anodizing solution is additionally comprised of a phosphorus containing acid and/or salt, and/or a chelating agent. Preferably, the phosphorus containing acid and/or salt comprises one or more of a phosphoric acid, a phosphoric acid salt, a phosphorous acid and a phosphorous acid salt. It is a further object of the invention to provide a method wherein pH of the anodizing solution is adjusted using ammonia, an amine, an alkali metal hydroxide or a mixture thereof.

It is an object of the invention to provide a method of forming a protective coating on a surface of a metallic article comprised predominantly of aluminum, the method comprising: providing an anodizing solution comprised of water, a phosphorus containing acid and/or salt, and one or more additional components selected from the group consisting of water-soluble and water-dispersible complex fluorides and mixtures thereof, the fluorides comprising elements selected from the group consisting of Ti, Zr, and combinations thereof; providing a cathode in contact with the anodizing solution; placing a metallic article comprised predominantly of aluminum as an anode in the anodizing solution; passing a direct current or an alternating current between the anode and the cathode for a time effective to form a first protective coating on the surface of the metal article; removing the metal article having a first protective coating from the anodizing solution and drying the article; and applying one or more layers of coating material to the metal article having a first protective coating, at least one of the layers comprising a thermal spray applied coating, PTFE or silicone, to form a second protective coating.

It is a further object of the invention to provide a method wherein the anodizing solution is prepared using a complex fluoride comprising an anion comprising at least 4 fluorine atoms and at least one atom selected from the group consisting of Ti, Zr, and combinations thereof.

It is a further object of the invention to provide a method wherein the anodizing solution is prepared using a complex fluoride selected from the group consisting of H2TiF6, H2ZrF6, salts of H2TiF6, salts of H2ZrF6, and mixtures thereof.

It is a further object of the invention to provide a method wherein the complex fluoride is introduced into the anodizing solution at a concentration of at least 0.05M.

It is a further object of the invention to provide a method wherein the direct current has an average voltage of not more than 250 volts.

It is a further object of the invention to provide a method wherein the anodizing solution is additionally comprised of a chelating agent.

It is a further object of the invention to provide a method wherein the anodizing solution is comprised of at least one complex oxyfluoride prepared by combining at least one complex fluoride of at least one element selected from the group consisting of Ti, Zr, and at least one compound which is an oxide, hydroxide, carbonate or alkoxide of at least one element selected from the group consisting of Ti, Zr, Hf, Sn, B, Al and Ge.

It is a further object of the invention to provide a method wherein the anodizing solution has a pH of from about 2 to about 6.

It is an object of the invention to provide a method of forming a protective coating on an article having a metallic surface comprised of aluminum or aluminum alloy, the method comprising: providing an anodizing solution, the anodizing solution having been prepared by dissolving a water-soluble complex fluoride and/or oxyfluoride of an element selected from the group consisting of Ti, Zr, Hf, Sn, Ge, B and combinations thereof and an inorganic acid or salt thereof that contains phosphorus in water; providing a cathode in contact with the anodizing solution; placing an article comprising at least one metallic surface comprised of aluminum or aluminum alloy as an anode in the anodizing solution; passing a direct current or an alternating current between the anode and the cathode for a time effective to form a first protective coating on the at least one metallic surface; removing the article comprising at least one metallic surface having a first protective coating from the anodizing solution and drying the article; and applying one or more layers of coating material to the first protective coating, at least one of the layers comprising a thermal spray applied coating, PTFE or silicone, to form a second protective coating.

It is a further object of the invention to provide a method wherein pH of the anodizing solution is adjusted using ammonia, an amine, an alkali metal hydroxide or a mixture thereof.

It is a further object of the invention to provide a method wherein the current is pulsed direct current having an average voltage of not more than 150 volts (Higher average voltages may be used, however, they are generally less economical in power consumed).

It is a further object of the invention to provide a method wherein at least one compound which is an oxide, hydroxide, carbonate or alkoxide of at least one element selected from the group consisting of Ti, Zr, Hf, Sn, B, Al and Ge is additionally used to prepare the anodizing solution.

It is an object of the invention to provide a method of forming a protective coating on a surface of an article comprised of aluminum, the method comprising: providing an anodizing solution, the anodizing solution having been prepared by combining one or more water-soluble complex fluorides of titanium and/or zirconium or salts thereof, a phosphorus containing oxy acid and/or salt and optionally, an oxide, hydroxide, carbonate or alkoxide of zirconium; providing a cathode in contact with the anodizing solution; placing an article comprised of aluminum as an anode in the anodizing solution; and passing a direct current or an alternating current between the anode and the cathode for a time effective to form the protective coating on a surface of the article; removing the article having a first protective coating from the anodizing solution and drying the article; and applying one or more layers of coating material to the article having a first protective coating, at least one of the layers comprising a thermal spray applied coating, PTFE or silicone, to form a second protective coating.

It is a further object of the invention to provide a method wherein one or more of H2TiF6, salts of H2TiF6, H2ZrF6, and salts of H2ZrF6 is used to prepare the anodizing solution. It is a further object of the invention to provide a method wherein zirconium basic carbonate is also used to prepare the anodizing solution. It is a further object of the invention to provide a method wherein the one or more water-soluble complex fluorides is a complex fluoride of titanium or zirconium and the current is direct current, pulsed or non-pulsed.

DETAILED DESCRIPTION OF THE INVENTION

Except in the claims and the operating examples, or where otherwise expressly indicated, all numerical quantities in this description indicating amounts of material or conditions of reaction and/or use are to be understood as modified by the word "about" in describing the scope of the invention. Practice within the numerical limits stated is generally preferred, however. Also, throughout the description, unless expressly stated to the contrary: percent, "parts of", and ratio values are by weight or mass; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) between one or more newly added constituents and one or more constituents already present in the composition when the other constituents are added; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise, such counterions may be freely selected, except for avoiding counterions that act adversely to an object of the invention; the term "thermal spray", "thermal spray applied coating" and grammatical variations include the process and coating made by the process of directing heated or unheated particles of a coating material toward a target surface at a velocity sufficiently high to cause the particles to adhere to the target surface and includes, by way of non-limiting example, cold spray, plasma spray, low pressure plasma spray (LPPS), air plasma spray (APS) and high velocity oxy-fuel (HVOF), powder flame spray, wire/rod flame spray, detonation/explosive flame spray and wire arc spray and similar processes known in the industry; the term "paint" and its grammatical variations includes any more specialized types of protective exterior coatings that are also known as, for example, lacquer, electropaint, shellac, porcelain enamel, top coat, mid coat, base coat, color coat, and the like; the word "mole" means "gram mole", and the word itself and all of its grammatical variations may be used for any chemical species defined by all of the types and numbers of atoms present in it, irrespective of whether the species is ionic, neutral, unstable, hypothetical or in fact a stable neutral substance with well defined molecules; and the terms "solution", "soluble", "homogeneous", and the like are to be understood as including not only true equilibrium solutions or homogeneity but also dispersions.

There is no specific limitation on the aluminum or aluminum alloy article to be subjected to anodization in accordance with the present invention. It is desirable that at least a portion of the article is fabricated from a metal that contains not less than 50% by weight, more preferably not less than 70% by weight aluminum. Preferably, the article is fabricated from a metal that contains not less than, in increasing order of preference, 30, 40, 50, 60, 70, 80, 90, 100% by weight aluminum.

In carrying out the anodically applied electrodeposited coating of a workpiece, an anodizing solution is employed which is preferably maintained at a temperature between about 0° C. and about 90° C. It is desirable that the temperature be at least about, in increasing order of preference 5, 10, 15, 20, 25, 30, 40, 50° C. and not more than 90, 88, 86, 84, 82, 80, 75, 70, 65° C.

The anodically applied electrodeposited coating process comprises immersing at least a portion of the workpiece in the anodizing solution, which is preferably contained within a bath, tank or other such container. The article (workpiece) functions as the anode. A second metal article that is cathodic relative to the workpiece is also placed in the anodizing solution. Alternatively, the anodizing solution is placed in a container which is itself cathodic relative to the workpiece (anode). When using pulsed current, an average voltage potential not in excess of in increasing order of preference 250 volts, 200 volts, 175 volts, 150 volts, 125 volts, 120 volts, 115 volts is then applied across the electrodes until a coating of the desired thickness is formed on the surface of the aluminum article in contact with the anodizing solution. When certain anodizing solution compositions are used, good results may be obtained even at average voltages not in excess of 100 volts. It has been observed that the formation of a corrosion- and abrasion-resistant protective coating is often associated with anodization conditions which are effective to cause a visible light-emitting discharge (sometimes referred to herein as a "plasma", although the use of this term is not meant to imply that a true plasma exists) to be generated (either on a continuous or intermittent or periodic basis) on the surface of the aluminum article.

In one embodiment, direct current (DC) is used at 10-400 Amps/square foot and 200 to 600 volts. In another embodiment, the current is pulsed or pulsing current. Non-pulsed direct current is desirably used in the range of 200-600 volts; preferably the voltage is at least, in increasing order of preference 200, 250, 300, 350, 400 and at least for the sake of economy, not more than in increasing order of preference 700, 650, 600, 550. Direct current is preferably used, although alternating current may also be utilized (under some conditions, however, the rate of coating formation may be lower using AC). The frequency of the current may range from 10 to 10,000 Hertz; higher frequencies may be used. In embodiments where AC power is used, 300 to 600 volts is the preferred voltage level.

In a preferred embodiment, the pulsed signal may have an "off" time between each consecutive voltage pulse preferably lasting between about 10% as long as the voltage pulse and about 1000% as long as the voltage pulse. During the "off" period, the voltage need not be dropped to zero (i.e., the voltage may be cycled between a relatively low baseline voltage and a relatively high ceiling voltage). The baseline voltage thus may be adjusted to a voltage that is from 0% to 99.9% of the peak applied ceiling voltage. Low baseline voltages (e.g., less than 30% of the peak ceiling voltage) tend to favor the generation of a periodic or intermittent visible light-emitting discharge, while higher baseline voltages (e.g., more than 60% of the peak ceiling voltage) tend to result in continuous plasma anodization (relative to the human eye frame refresh rate of 0.1-0.2 seconds). The current can be pulsed with either electronic or mechanical switches activated by a frequency generator. The average amperage per square foot is at least in increasing order of preference 10, 20, 30, 40, 50, 60, 70, 80, 90, 100, 105, 110, 115, and not more than at least for economic considerations in increasing order of preference 300, 275, 250, 225, 200, 180, 170, 160, 150, 140, 130, 125. More complex waveforms may also be employed, such as, for example, a DC signal having an AC component. Alternating current may also be used, with voltages desirably between about 200 and about 600 volts. The higher the concentration of the electrolyte in the anodizing solution, the lower the voltage can be while still depositing satisfactory coatings.

A number of different types of anodizing solutions may be successfully used in the process of this invention, as will be described in more detail hereinafter. However, it is believed that a wide variety of water-soluble or water-dispersible anionic species containing metal, metalloid, and/or non-metal elements are suitable for use as components of the anodizing solution. Suitable elements include, for example, phosphorus, titanium, zirconium, hafnium, tin, germanium, boron, vanadium, fluoride, zinc, niobium, molybdenum, manganese, tungsten and the like (including combinations of such elements). In a preferred embodiment of the invention, the components of the anodizing solution are titanium and/or zirconium.

Without wishing to be bound by theory, it is thought that the anodically applied electrodeposited coating of aluminum and aluminum alloy articles in the presence of complex fluoride or oxyfluoride species to be described subsequently in more detail leads to the formation of surface films comprised of metal/metalloid oxide ceramics (including partially hydrolyzed glasses containing O, OH and/or F ligands) or metal/non-metal compounds wherein the metal comprising the surface film includes metals from the complex fluoride or oxyfluoride species and some metals from the article. From analysis of coatings of the Examples, it appears that the majority of metals in the coating come from the anodizing solution. The glow, plasma or sparking which often occurs during anodically applied electrodeposited coating in accordance with the present invention is believed to destabilize the anionic species, causing certain ligands or substituents on such species to be hydrolyzed or displaced by O and/or OH or metal-organic bonds to be replaced by metal-O or metal-OH bonds. Such hydrolysis and displacement reactions render the species less water-soluble or water-dispersible, thereby driving the formation of the surface coating.

A pH adjuster may be present in the anodizing solution; suitable pH adjusters include, by way of nonlimiting example, ammonia, amine or other base. The amount of pH adjuster is limited to the amount required to achieve a pH of 2-11, preferably 2-8 and most preferably 3-6; and is dependent upon the type of electrolyte used in the anodizing bath. In a preferred embodiment, the amount of pH adjuster is less than 1% w/v.

In certain embodiments of the invention, the anodizing solution is essentially (more preferably, entirely) free of chromium, permanganate, borate, sulfate, free fluoride and/or free chloride.

The anodizing solution used preferably comprises water and at least one complex fluoride or oxyfluoride of an element selected from the group consisting of Ti, Zr, Hf, Sn, Al, Ge and B (preferably, Ti and/or Zr). The complex fluoride or oxyfluoride should be water-soluble or water-dispersible and preferably comprises an anion comprising at least 1 fluorine atom and at least one atom of an element selected from the group consisting of Ti, Zr, Hf, Sn, Al, Ge or B. The complex fluorides and oxyfluorides (sometimes referred to by workers in the field as "fluorometallates") preferably are substances with molecules having the following general empirical formula (I):

$$H_pT_qF_rO_s \quad (I)$$

wherein: each of p, q, r, and s represents a non-negative integer; T represents a chemical atomic symbol selected from the group consisting of Ti, Zr, Hf, Sn, Al, Ge, and B; r is at least 1; q is at least 1; and, unless T represents B, (r+s) is at least 6. One or more of the H atoms may be replaced by suitable cations such as ammonium, metal, alkaline earth metal or alkali metal cations (e.g., the complex fluoride may be in the form of a salt, provided such salt is water-soluble or water-dispersible).

Illustrative examples of suitable complex fluorides include, but are not limited to, H2TiF6, H2ZrF6, H2HfF6, H2GeF6, H2SnF6, H3AlF6, and HBF4 and salts (fully as well as partially neutralized) and mixtures thereof. Examples of suitable complex fluoride salts include SrZrF6, MgZrF6, Na2ZrF6, Li2ZrF6, SrTiF6, MgTiF6, Na2TiF6 and Li2TiF6.

The total concentration of complex fluoride and complex oxyfluoride in the anodizing solution preferably is at least about 0.005 M. Generally, there is no preferred upper concentration limit, except of course for any solubility constraints. It is desirable that the total concentration of complex fluoride and complex oxyfluoride in the anodizing solution be at least 0.005, 0.010, 0.020, 0.030, 0.040, 0.050, 0.060, 0.070, 0.080, 0.090, 0.10, 0.20, 0.30, 0.40, 0.50, 0.60 M, and if only for the sake of economy be not more than, in increasing order of preference 2.0, 1.5, 1.0, 0.80 M.

To improve the solubility of the complex fluoride or oxyfluoride, especially at higher pH, it may be desirable to include an inorganic acid (or salt thereof) that contains fluorine but does not contain any of the elements Ti, Zr, Hf, Sn, Al, Ge or B in the electrolyte composition. Hydrofluoric acid or a salt of hydrofluoric acid such as ammonium bifluoride is preferably used as the inorganic acid. The inorganic acid is believed to prevent or hinder premature polymerization or condensation of the complex fluoride or oxyfluoride, which otherwise (particularly in the case of complex fluorides having an atomic ratio of fluorine to "T" of 6) may be susceptible to slow spontaneous decomposition to form a water-insoluble oxide. Certain commercial sources of hexafluorotitanic acid and hexafluorozirconic acid are supplied with an inorganic acid or salt thereof, but it may be desirable in certain embodiments of the invention to add still more inorganic acid or inorganic salt.

A chelating agent, especially a chelating agent containing two or more carboxylic acid groups per molecule such as nitrilotriacetic acid, ethylene diamine tetraacetic acid, N-hydroxyethyl-ethylenediamine triacetic acid, or diethylene-triamine pentaacetic acid or salts thereof, may also be included in the anodizing solution. Other Group IV compounds may be used, such as, by way of non-limiting example, Ti and/or Zr oxalates and/or acetates, as well as other stabilizing ligands, such as acetylacetonate, known in the art that do not interfere with the anodic deposition of the anodizing solution and normal bath lifespan. In particular, it is necessary to avoid organic materials that either decompose or undesirably polymerize in the energized anodizing solution.

Suitable complex oxyfluorides may be prepared by combining at least one complex fluoride with at least one compound which is an oxide, hydroxide, carbonate, carboxylate or alkoxide of at least one element selected from the group consisting of Ti, Zr, Hf, Sn, B, Al, or Ge. Examples of suitable compounds of this type that may be used to prepare the anodizing solutions of the present invention include, without limitation, zirconium basic carbonate, zirconium acetate and zirconium hydroxide. The preparation of complex oxyfluorides suitable for use in the present invention is described in U.S. Pat. No. 5,281,282, incorporated herein by reference in its entirety. The concentration of this compound used to make up the anodizing solution is preferably at least, in increasing preference in the order given, 0.0001, 0.001 or 0.005 moles/kg (calculated based on the moles of the element(s) Ti, Zr, Hf, Sn, B, Al and/or Ge present in the compound used). Independently, the ratio of the concentration of moles/kg of complex fluoride to the concentration in moles/kg of the oxide, hydroxide, carbonate or alkoxide compound preferably is at least, with increasing preference in the order given, 0.05:1, 0.1:1, or 1:1. In general, it will be preferred to maintain the pH of the anodizing solution in this embodiment of the invention in the range of from about 2 to about 11, more preferably 2-8, and in one embodiment a pH of 2-6.5 is desirable. A base such as ammonia, amine or alkali metal hydroxide may be used, for example, to adjust the pH of the anodizing solution to the desired value.

Rapid coating formation is generally observed at average voltages of 150 volts or less (preferably 100 or less), using pulsed DC. It is desirable that the average voltage be of sufficient magnitude to generate coatings of the invention at a rate of at least about 1 micron thickness per minute, preferably at least 3-8 microns in 3 minutes. If only for the sake of economy, it is desirable that the average voltage be less than, in increasing order of preference, 150, 140, 130, 125, 120, 115, 110, 100, 90 volts. The time required to deposit a coating of a selected thickness is inversely proportional to the concentration of the anodizing bath and the amount of current Amps/square foot used. By way of non-limiting example, parts may be coated with an 8 micron thick metal oxide layer in as little as 10-15 seconds at concentrations cited in the Examples by increasing the Amps/square foot to 300-2000 amps/square foot. The determination of correct concentrations and current amounts for optimum part coating in a given period of time can be made by one of skill in the art based on the teachings herein with minimal experimentation.

Coatings of the invention are typically fine-grained and desirably are at least 1 micron thick, preferred embodiments have coating thicknesses from 1-20 microns, preferably 2-10 microns, most preferably 3-9 microns. Thinner or thicker coatings may be applied, although thinner coatings may not provide the desired coverage of the article. Without being bound by a single theory, it is believed that, particularly for insulating oxide films, as the coating thickness increases the film deposition rate is eventually reduced to a rate that approaches zero asymptotically. Add-on mass of coatings of the invention ranges from approximately 5-200 g/m$^2$ or more and is a function of the coating thickness and the composition of the coating. It is desirable that the add-on mass of coatings be at least, in increasing order of preference, 5, 10, 11, 12, 14, 16, 18, 20, 25, 30, 35, 40, 45, 50 g/m$^2$.

An anodizing solution for use in forming a white protective coating on an aluminum or aluminum alloy substrate may be prepared using the following components:

| | |
|---|---|
| Zirconium Basic Carbonate | 0.01 to 1 wt. % |
| $H_2ZrF_6$ | 0.1 to 10 wt. % |
| Water | Balance to 100% | pH adjusted to the range of 2 to 5 using ammonia, amine or other base.

In a preferred embodiment utilizing zirconium basic carbonate and $H_2ZrF_6$, it is desirable that the anodizing solution comprise zirconium basic carbonate in an amount of at least, in increasing order of preference 0.05, 0.10, 0.15, 0.20, 0.25, 0.30, 0.35, 0.40, 0.45, 0.50, 0.55, 0.60 wt. % and not more than, in increasing order of preference 1.0, 0.97, 0.95, 0.92, 0.90, 0.87, 0.85, 0.82, 0.80, 0.77 wt. %. In this embodiment, it is desirable that the anodizing solution comprises $H_2ZrF_6$ in an amount of at least, in increasing order of preference 0.2, 0.4, 0.6, 0.8.1.0, 1.2, 1.3, 1.4, 1.5, 2.0, 2.5, 3.0, 3.5, wt. % and not more than, in increasing order of preference 10, 9.75, 9.5, 9.25, 9.0, 8.75, 8.5, 8.25, 8.0, 7.75 4.0, 4.5, 5.0, 5.5, 6.0 wt. %.

In a particularly preferred embodiment the amount of zirconium basic carbonate ranges from about 0.75 to 0.25 wt. %, the $H_2ZrF_6$ ranges from 6.0 to 9.5 wt %; a base such as ammonia is used to adjust the pH to ranges from 3 to 5.

It is believed that the zirconium basic carbonate and the hexafluorozirconic acid combine to at least some extent to form one or more complex oxyfluoride species. The resulting anodizing solution permits rapid anodization of aluminum-containing articles using pulsed direct current having an average voltage of not more than 175 volts. In this particular embodiment of the invention, better coatings are generally obtained when the anodizing solution is maintained at a relatively high temperature during anodization (e.g., 40 degrees C. to 80 degrees C.). Alternatively, alternating current preferably having a voltage of from 300 to 600 volts may be used. The solution has the further advantage of forming protective coatings that are white in color, thereby eliminating the need to paint the anodized surface if a white decorative finish is desired. The anodically applied electrodeposited coatings produced in accordance with this embodiment of the invention typically have L values of at least 80, high hiding power at coating thicknesses of 4 to 8 microns, and excellent acid, alkali and corrosion resistance. To the best of the inventor's knowledge, no anodization technologies being commercially practiced today are capable of producing coatings having this desirable combination of properties.

In another particularly preferred embodiment of the invention, the anodizing solution used comprises water, a water-soluble or water-dispersible phosphorus containing acid or salt, such as a phosphorus oxyacid or salt, preferably an acid or salt containing phosphate anion; and at least one of H2TiF6 and H2ZrF6. It is desirable that the pH of the anodizing solution is neutral to acid, 6.5 to 1, more preferably, 6 to 2, most preferably 5-3.

It was surprisingly found that the combination of a phosphorus containing acid and/or salt and the complex fluoride in the anodizing solution produced a different type of anodically applied electrodeposited coating. The oxide coatings deposited comprised predominantly oxides of anions present in the anodizing solution prior to any dissolution of the anode. That is, this process results in coatings that result predominantly from deposition of substances that are not drawn from the body of the anode, resulting in less change to the substrate of the article being anodized.

In this embodiment, it is desirable that the anodizing solution comprise the at least one complex fluoride, e.g. H2TiF6 and/or H2ZrF6 in an amount of at least, in increasing order of preference 0.2, 0.4, 0.6, 0.8. 1.0, 1.2, 1.3, 1.4, 1.5, 2.0, 2.5, 3.0, 3.5 wt. % and not more than, in increasing order of preference 10, 9.5, 9.0, 8.5, 8.0, 7.5, 7.0, 6.5, 6.0, 5.5, 5.0, 4.5. 4.0 wt. %. The at least one complex fluoride may be supplied from any suitable source such as, for example, various aqueous solutions known in the art. For H2TiF6 commercially available solutions typically range in concentration from 50-60 wt %; while for H2ZrF6 such solutions range in concentration between 20-50%.

The phosphorus oxysalt may be supplied from any suitable source such as, for example, ortho-phosphoric acid, pyro-phosphoric acid, tri-phosphoric acid, meta-phosphoric acid, polyphosphoric acid and other combined forms of phosphoric acid, as well as phosphorous acids, and hypo-phosphorous acids, and may be present in the anodizing solution in partially or fully neutralized form (e.g., as a salt, wherein the counter ion(s) are alkali metal cations, ammonium or other such species that render the phosphorus oxysalt water-soluble). Organophosphates such as phosphonates and the like may also be used (for example, the various phosphonates available from Rhodia Inc. and Solutia Inc.) provided that the organic component does not interfere with the anodic deposition.

Particularly preferred is the use of a phosphorus oxysalt in acid form. The phosphorus concentration in the anodizing solution is at least 0.01 M. It is preferred that the concentration of phosphorus in the anodizing solution be at least, in increasing order of preference, 0.01M, 0.015, 0.02, 0.03, 0.04, 0.05, 0.07, 0.09, 0.10, 0.12, 0.14, 0.16. In embodiments where the pH of the anodizing solution is acidic (pH<7), the phosphorus concentration can be 0.2 M, 0.3 M or more and preferably, at least for economy is not more than 1.0, 0.9, 0.8, 0.7, 0.6 M. In embodiments where the pH is neutral to basic, the concentration of phosphorus in the anodizing solution is not more than, in increasing order of preference 0.40, 0.30, 0.25, 0.20 M.

A preferred anodizing solution for use in forming a protective ceramic coating according to this embodiment on an aluminum or aluminum alloy substrate may be prepared using the following components:

| | |
|---|---|
| $H_2TiF_6$ | 0.05 to 10 wt. % |
| $H_3PO_4$ | 0.1 to 0.6 wt. % |
| Water | Balance to 100% |

The pH is adjusted to the range of 2 to 6 using ammonia, amine or other base.

With the aforedescribed anodizing solutions, the generation of a sustained "plasma" (visible light emitting discharge) during anodization is generally attained using pulsed DC having an average voltage of no more than 150 volts. In preferred operation, the average voltage does not exceed 100 volts.

The coatings produced in accordance with the invention typically range in color from blue-grey and light grey to charcoal grey depending upon the coating thickness and relative amounts of Ti and Zr oxides in the coatings. The coatings exhibit high hiding power at coating thicknesses of 2-10 microns, and excellent acid, alkali and corrosion resistance. A test panel of a 400 series aluminum alloy having anodically applied electrodeposited coating according to a process of the invention had an 8-micron thick layer of adherent ceramic predominantly comprising titanium dioxide. This coated test panel was scratched down to bare metal prior to salt fog testing. Despite being subjected to 1000 hours of salt fog testing according to ASTM B-117-03, there was no corrosion extending from the scribed line.

A commercially available bare aluminum wheel was cut into pieces and the test specimen was anodically coated according to a process of the invention with a 10-micron thick layer of ceramic predominantly comprising titanium dioxide. Without being bound to a single theory, the darker grey coating is attributed to the greater thickness of the coating. The coating completely covered the surfaces of the aluminum wheel including the design edges. The coated aluminum wheel portion had a line scratched into the coating down to bare metal prior to salt fog testing. Despite being subjected to 1000 hours of salt fog according to ASTM B-117-03, there is no corrosion extending from the scribed line and no corrosion at the design edges. References to "design edges" will be understood to include the cut edges as well as shoulders or indentations in the article which have or create external corners at the intersection of lines generated by the intersection of two planes. The excellent protection of the design edges is an improvement over conversion coatings, including chrome containing conversion coatings, which show corrosion at the design edges after similar testing.

In another aspect of the invention, Applicant surprisingly discovered that titanium containing substrates and aluminum containing substrates can be coated simultaneously in the anodizing process of the invention. A titanium clamp was used to hold an aluminum test panel during anodically applied electrodeposited coating according to the invention and both substrates, the clamp and the panel, were coated simultaneously according to the process of the invention. Although the substrates do not have the same composition, the coating on the surface appeared uniform and monochromatic. The substrates were coated with an anodically applied electrodeposited coating according to a process of the invention with a 7-micron thick layer of ceramic predominantly comprising titanium dioxide. The coating was a light grey in color, and provided good hiding power.

Before being subjected to anodic treatment in accordance with the invention, the aluminiferous metal article preferably is subjected to a cleaning and/or degreasing step. For example, the article may be chemically degreased by exposure to an alkaline cleaner such as, for example, a diluted solution of PARCO Cleaner 305 (a product of the Henkel Surface Technologies division of Henkel Corporation, Madison Heights, Mich.). After cleaning, the article preferably is rinsed with water. Cleaning may then, if desired, be followed by etching with an acidic deoxidixer/desmutter such as SC592, commercially available from Henkel Corporation, or other deoxidizing solution, followed by additional rinsing prior to anodically applied electrodeposited coating. Such pre-anodization treatments are well known in the art.

After anodically applied electrodeposited coating, the protective ceramic coatings produced on the surface of the workpiece are subjected to a further treatment. The treatment may comprise coating with a variety of coating materials including, but not limited to paint, a thermal spray applied coating and/or a PTFE or silicone containing paint and other suitable materials known in the art. Thermal spray applied coating and/or a PTFE or silicone, alone or in combination are preferred. Suitable thermal spray applied coating compositions and thicknesses are dependent upon the intended use of the article to be coated and are known in the industry. By way of non-limiting example, coating materials that can be applied by thermal spray include metals, oxides, cermets, hard metal compounds, certain organic substances and glasses, as well as combinations thereof, at 1-5 mils. Oxides are preferred. Typical thickness for the thermal spray applied coating is as is known in the art, preferably 50-100 microns, but may be 1000 microns or more. Other coating materials include PTFE or silicone paint that may be applied to the anodized surface, with or without an intervening layer of thermal spray applied coating, and is typically at a film build (thickness) of from about 3 to about 30 microns to form a non-stick layer. Suitable PTFE topcoats are known in the industry and typically comprise PTFE particles dispersed with surfactant, solvent and other adjuvants in water. Prior art PTFE-coated aluminiferous articles, require a primer and midcoat to be applied prior to a topcoat containing PTFE. Primers, midcoats and PTFE-containing topcoats, as well as silicone-containing paints, are known in the art and providing such non-stick coatings that are suitable for use in the invention is within the knowledge of those skilled in the art.

Articles having the first protective coating of the invention may be coated with PTFE coating systems known in the art, but do not require a three-step coating process to adhere PTFE. In embodiments having a zirconium oxide protective coating of the invention, Applicant surprisingly found that PTFE topcoat may be applied directly onto the zirconium oxide layer in the absence of any intermediate coating. In a preferred embodiment, the PTFE topcoat is applied to the zirconium oxide layer in the absence of a primer or midcoat or both. Similarly, embodiments having a titanium oxide protective coating of the invention, show good adhesion of the PTFE topcoat without application of a midcoat, thus eliminating one processing step and its attendant costs. In a preferred embodiment, the PTFE topcoat is applied to the titanium oxide layer having a primer thereon and in the absence of a midcoat, resulting in non-stick coating. Applicant also discovered that a silicone containing paint can be applied directly to zirconium and titanium coatings of the invention with good adherence resulting in non-stick coating.

The invention will now be further described with reference to a number of specific examples, which are to be regarded solely as illustrative and not as restricting the scope of the invention.

EXAMPLES

Example 1

An anodizing solution was prepared using the following components:

|  | Parts per 1000 grams |
|---|---|
| Zirconium Basic Carbonate | 5.24 |
| Fluozirconic Acid (20% solution) | 80.24 |
| Deionized Water | 914.5 |

The pH was adjusted to 3.9 using ammonia. An aluminum-containing article was subjected to anodization for 120 seconds in the anodizing solution using pulsed direct current having a peak ceiling voltage of 450 volts (approximate average voltage=75 volts). The "on" time was 10 milliseconds, the "off" time was 30 milliseconds (with the "off" or baseline voltage being 0% of the peak ceiling voltage). A uniform white coating 6.3 microns in thickness was formed on the surface of the aluminum-containing article. A periodic to continuous plasma (rapid flashing just visible to the unaided human eye) was generated during anodization. The test panels of Example 1 were analyzed using energy dispersive spectroscopy and found to comprise a coating comprised predominantly of zirconium and oxygen.

Example 2

An aluminum alloy article was cleaned in a diluted solution of PARCO Cleaner 305, an alkaline cleaner, and an alkaline etch cleaner, Aluminum Etchant 34, both commercially available from Henkel Corporation. The aluminum alloy article was then desmutted in SC592, an iron based acidic deoxidizer commercially available from Henkel Corporation.

The aluminum alloy article was then coated, using the anodizing solution of Example 1, by being subjected to anodization for 3 minutes in the anodizing solution using pulsed direct current having a peak ceiling voltage of 500 volts (approximate average voltage=130 volts). The "on" time was 10 milliseconds, the "off" time was 30 milliseconds (with the "off" or baseline voltage being 0% of the peak ceiling voltage). Ceramic coatings of 3-6 microns in thickness were formed on the surface of the aluminum alloy article. The coatings had a uniform white appearance.

Example 3

A ceramic coated aluminum alloy article from Example 2 (said article hereinafter referred to as Example 3) was subjected to testing for adherence of PTFE and compared to a similar aluminum alloy article that had been subjected to the cleaning, etching and desmutting stages of Example 2 and then directly coated with PTFE as described below (Comparative Example 1).

Comparative Example 1 and Example 3 were rinsed in deionized water and dried. A standard PTFE-containing topcoat, commercially available from Dupont under the name 852-201, was spray applied as directed by the manufacturer. The PTFE coating on Comparative Example 1 and Example 3 were cured at 725° F. for 30 minutes and then immersed in cold water to cool to room temperature. The PTFE film thickness was 12-15 microns.

The films were crosshatched and subjected to adhesion tests wherein commercially available 898 tape was firmly adhered to each film and then pulled off at a 90° angle to the surface. Comparative Example 1 had 100% delamination of the PTFE coating in the cross-hatch area. No loss of adhesion was observed in the PTFE coating adhered to the ceramic-coated article from Example 3.

To assess hot/cold cycling stability, Example 3 was heated to 824° F. for two hours and immediately subjected to 10 cold-water dips. The film was again cross-hatched and no delamination of the PTFE coating was observed. The underlying ceramic coating showed no visual changes in appearance.

Example 4

An aluminum alloy substrate in the shape of a cookware pan was the test article for Example 4. The article was cleaned in a diluted solution of PARCO Cleaner 305, an alkaline cleaner, and an alkaline etch cleaner, such as Aluminum Etchant 34, both commercially available from Henkel Corporation. The aluminum alloy article was then desmutted in SC0592, an iron based acidic deoxidizer commercially available from Henkel Corporation.

The aluminum alloy article was then coated, using an anodizing solution prepared using the following components:

| | |
|---|---|
| $H_2TiF_6$ | 12.0 g/L |
| $H_3PO_4$ | 3.0 g/L |

The pH was adjusted to 2.1 using ammonia. The test article was subjected to anodization for 6 minutes in the anodizing solution using pulsed direct current having a peak ceiling voltage of 500 volts (approximate average voltage=140 volts). The "on" time was 10 milliseconds, the "off" time was 30 milliseconds (with the "off" or baseline voltage being 0% of the peak ceiling voltage). A uniform blue-grey coating 10 microns in thickness was formed on the surface of the test article. The test article was analyzed using energy dispersive spectroscopy and found to have a coating predominantly of titanium and oxygen, with trace amounts of phosphorus, estimated at less than 10 wt %. The titanium dioxide ceramic-coated test article of Example 4 was subjected to acid stability testing by heating lemon juice (citric acid) of pH 2 and boiling to dryness in the article. No change in the oxide layer was noted.

Example 5

An aluminum alloy test panel of 400 series aluminum alloy was coated according to the procedure of Example 4. A scribe line was scratched into the test panel down to bare metal prior to salt fog testing. Despite being subjected to 1000 hours of salt fog testing according to ASTM B-117-03, there was no corrosion extending from the scribed line.

Example 6

An aluminum alloy wheel was the test article for Example 6. The substrate was treated as in Example 4, except that the anodizing treatment was as follows:

The aluminum alloy article was coated, using an anodizing solution prepared using the following components:

| | |
|---|---|
| $H_2TiF_6$ (60%) | 20.0 g/L |
| $H_3PO_4$ | 4.0 g/L |

The pH was adjusted to 2.2 using aqueous ammonia. The article was subjected to anodization for 3 minutes in the anodizing solution using pulsed direct current having a peak ceiling voltage of 450 volts (approximate average voltage=130 volts) at 90° F. The "on" time was 10 milliseconds, the "off" time was 30 milliseconds (with the "off" or baseline voltage being 0% of the peak ceiling voltage). The average current density was 40 amps/ft2. A uniform coating, 8 microns in thickness, was formed on the surface of the aluminum-containing article. The article was analyzed using qualitative energy dispersive spectroscopy and found to have a coating predominantly of titanium, oxygen and a trace of phosphorus.

A line was scribed into the coated article down to bare metal and the article was subjected to the following testing: 1000 hours of salt fog per ASTM B-117-03. The article showed no signs of corrosion along the scribe line or along the design edges.

Example 7

An aluminum alloy test panel was treated as in Example 4. The test panel was submerged in the anodizing solution using a titanium alloy clamp. A uniform blue-grey coating, 7 microns in thickness, was formed on the surface of the predominantly aluminum test panel. A similar blue-grey coating, 7 microns, in thickness was formed on the surface of the predominantly titanium clamp. Both the test panel and the clamp were analyzed using qualitative energy dispersive spectroscopy and found to have a coating predominantly of titanium, oxygen and a trace of phosphorus.

Example 8

Aluminum alloy test panels of 6063 aluminum were treated according to the procedure of Example 4, except that the anodizing treatment was as follows:

The aluminum alloy articles were coated, using an anodizing solution containing phosphorous acid in place of phosphoric acid:

| | |
|---|---|
| $H_2TiF_6$ (60%) | 20.0 g/L |
| $H_3PO_3$ (70%) | 8.0 g/L |

The aluminum alloy articles were subjected to anodization for 2 minutes in the anodizing solution. Panel A was subjected to 300 to 500 volts applied voltage as direct current. Panel B was subjected to the same peak voltage but as pulsed direct current. A uniform grey coating 5 microns in thickness was formed on the surface of both Panel A and Panel B.

Example 9

The test article of Example 4, now having a coating of titanium dioxide ceramic, was the subject of Example 9. Example 9 was rinsed in deionized water and dried. The inside of the article was overcoated with Dupont Teflon® primer and topcoat paints, available from Dupont as 857-101 and 852-201, respectively, spray applied as directed by the manufacturer. The primer and topcoat on Example 9 were cured at 725° F. for 30 minutes and then immersed in cold water to cool to room temperature. The PTFE film thickness was 5-15 microns.

Comparative Example 2 was a commercially available aluminum pan having a non-stick seal over a hard-coat anodized coating of aluminum oxide on the inner and outer pan surfaces.

Table 1 shows the results of repeated exposure to typical dishwasher cycles of hot water and alkaline cleaning agents.

TABLE 1

| Example | Outside of Pan | Inside of Pan |
|---|---|---|
| Comparative Example 2 | Non-stick seal removed within 6 washes and hardcoat is attacked at surface - part develops white discoloration | Non-stick seal removed within 6 washes and hardcoat is attacked at surface - part is covered with white discoloration |
| Example 9 - Titanium Dioxide | Ceramic coating unaffected after 18 wash cycles | Teflon ® coating unaffected after 18 wash cycles |

Example 10

For Examples 10A-D, 6063 aluminum alloy panels were cleaned in a diluted solution of PARCO Cleaner 305, an alkaline cleaner and an alkaline etch cleaner, such as Aluminum Etchant 34, both commercially available from Henkel Corporation. The aluminum alloy panels were then desmutted in SC592, an iron based acidic deoxidizer commercially available from Henkel Corporation.

The aluminum alloy panels of Examples 10A-D were coated, using an anodizing solution prepared using the following components:

| | |
|---|---|
| $H_2TiF_6$ (60%) | 20.0 g/L |
| $H_3PO_4$ (75%) | 4.0 g/L |

The pH was adjusted to 2.2 using aqueous ammonia. The panels were subjected to anodization for 3 minutes in the anodizing solution using pulsed direct current having a peak ceiling voltage of 450 volts (approximate average voltage=130 volts) at 90° F. The "on" time was 10 milliseconds, the "off" time was 30 milliseconds (with the "off" or baseline voltage being 0% of the peak ceiling voltage). The average current density was 40 amps/ft2. A uniform coating, 7.6 microns in thickness, was formed on the surface of the aluminum-containing panels of Examples 10A-D.

For Comparative Examples 3A-D, 6063 aluminum alloy panels were shot-blasted prior to thermal spray coating according to standard industry practice.

Each panel of Examples 10A-D and Comparative Examples 3A-D was then thermal spray coated using high velocity oxy-fuel (HVOF) with a thermal spray coating as disclosed in Table 2. Each panel was thereafter subjected to adhesion testing according to ASTM D3359 wherein the coatings were crosshatched and subjected to adhesion tests wherein commercially available 898 tape was firmly adhered to each film and then pulled off at a 90° angle to the surface.

TABLE 2

| Example | Anodically Applied Electrodeposited Layer | Thermal Spray Applied Coating | Test Results from ASTM D 3359 |
|---|---|---|---|
| Comparative 3A | Shot blasted, no anodic oxide layer | Titania - 99 wt % TiO2 | 0B Delamination 100% loss of thermal spray applied coating |
| 10A | Anodically Applied Electrodeposited TiO2 Layer Present | Titania - 99 wt % TiO2 | 5B Perfect 0% loss |
| Comparative 3B | Shot blasted, no anodic oxide layer | Alumina Composite- 98.5 wt % Al2O3; 1.0 wt % SiO2 | 0B 70% loss |
| 10B | Anodically Applied Electrodeposited TiO2 Layer Present | Alumina Composite- 98.5 wt % Al2O3; 1.0 wt % SiO2 | 4B Less than 1% loss |
| Comparative 3C | Shot blasted, no anodic oxide layer | Zirconia Composite- 80 wt % ZrO2; 20 wt % Y2O3 | 1B 50% loss |
| 10C | Anodically Applied Electrodeposited TiO2 Layer Present | Zirconia Composite- 80 wt % ZrO2; 20 wt % Y2O3 | 4B Less than 1% loss |
| Comparative 3D | Shot blasted, no anodic oxide layer | 79 wt % Fe 18 wt % Mo 7.0 wt % C | 0B 70% loss |
| 10D | Anodically Applied Electrodeposited TiO2 Layer Present | 79 wt % Fe 18 wt % Mo 7.0 wt % C | 5B Perfect 0% loss |

Although the invention has been described with particular reference to specific examples, it is understood that modifications are contemplated. Variations and additional embodiments of the invention described herein will be apparent to those skilled in the art without departing from the scope of the invention as defined in the claims to follow. The scope of the invention is limited only by the breadth of the appended claims.

What is claimed is:

1. An article of manufacture made according to a method comprising:
    A) providing an anodizing solution comprised of water and one or more additional components selected from the group consisting of:
        a) water-soluble complex fluorides,
        b) water-soluble complex oxyfluorides,
        c) water-dispersible complex fluorides, and
        d) water-dispersible complex oxyfluorides of elements selected from the group consisting of Ti, Zr, Hf, Sn, Al, Ge and B and mixtures thereof;
    B) providing a cathode in contact with said anodizing solution;
    C) placing a metal article comprising aluminum or aluminum alloy as an anode in said anodizing solution;
    D) passing a current between the anode and cathode through said anodizing solution for a time effective to form an adherent first protective coating on the surface of the metal article;
    E) removing the metal article having a first protective coating from the anodizing solution and drying said article; and
    F) applying one or more layers of coating material to the metal article having a first protective coating, to form a second protective coating layer either different from the first protective coating layer or having the same composition as the first protective coating layer and deposited non-anodically.

2. An article of manufacture comprising:
    a) a substrate having at least one surface comprising at least 30 wt % aluminum;
    b) an acid and alkali resistant, adherent first protective layer comprising titanium dioxide and/or zirconium oxide deposited on said surface; and
    c) a second protective layer adhered to said first protective layer, the second protective layer either different from the first protective coating layer or having the same composition as the first protective coating layer and deposited non-anodically;
    wherein said article exhibits less than 1% delamination in ASTM D 3359 testing and/or exhibits no corrosion after 1000 hours of ASTM B-117-03 salt fog testing.

3. The article of claim 2, wherein the second protective layer comprises an inner coating material layer substantially free of PTFE and an outer paint layer comprising PTFE.

4. The article of claim 2 wherein the adherent first protective layer is predominantly comprised of titanium dioxide.

5. The article of claim 2 wherein the second protective coating layer comprises a thermal spray applied coating and/or or one of PTFE and silicone.

6. The article of claim 4 wherein the adherent first protective layer predominantly comprised of titanium dioxide, further comprises phosphorus.

7. The article of claim 2 wherein the second protective layer is different from the first protective coating layer.

8. The article of claim 2 wherein the second protective layer has the same chemical composition as the first protective coating layer and is deposited non-anodically.

9. The article of claim 2 wherein the second protective layer comprises both organic and inorganic substances.

10. The article of claim 2 wherein the second protective layer is an organic coating.

11. The article of claim 2 wherein the second protective layer is an inorganic coating.

12. The article of claim 2 wherein the second protective layer is a paint.

13. The article of claim 2 wherein the second protective layer is a thermal spray applied coating.

14. The article of claim 13 wherein the thermal spray applied coating is selected from titania, alumina composite, zirconia composite, and a coating comprising Fe, Mo and C.

15. The article of claim 14 wherein the thermal spray applied coating is titania.

16. The article of claim 2 wherein the first protective layer further comprises niobium, molybdenum, manganese, and/or tungsten.

17. The article of claim 1 wherein the second protective layer is different from the first protective coating layer.

18. The article of claim 1 wherein the second protective layer has the same chemical composition as the first protective coating layer and is deposited non-anodically.

19. The article of claim 1 wherein the second protective layer comprises both organic and inorganic substances.

20. The article of claim 1 wherein the second protective layer is an organic coating.

21. The article of claim 1 wherein the second protective layer is an inorganic coating.

22. The article of claim 1 wherein the second protective layer is a paint.

23. The article of claim 1 wherein the second protective layer is a thermal spray applied coating.

24. The article of claim 23 wherein the thermal spray applied coating is selected from titania, alumina composite, zirconia composite, and a coating comprising Fe, Mo and C.

* * * * *